United States Patent
Matsushima et al.

(10) Patent No.: US 8,965,666 B2
(45) Date of Patent: Feb. 24, 2015

(54) KNOCK CONTROL DEVICE FOR ENGINE

(75) Inventors: Yuhei Matsushima, Tokyo (JP); Keitaro Ezumi, Hiroshima (JP); Tomokuni Kusunoki, Hiroshima (JP)

(73) Assignees: Mazda Motor Corporation, Hiroshima (JP); Mitsubishi Electric Corporation, Tokyo (JP)

( * ) Notice: Subject to any disclaimer, the term of this patent is extended or adjusted under 35 U.S.C. 154(b) by 563 days.

(21) Appl. No.: 13/238,113

(22) Filed: Sep. 21, 2011

(65) Prior Publication Data

US 2012/0192835 A1 Aug. 2, 2012

(30) Foreign Application Priority Data

Jan. 31, 2011 (JP) ................. 2011-017896

(51) Int. Cl.
F02P 5/00 (2006.01)
F02P 5/152 (2006.01)
F02D 35/02 (2006.01)
F02D 41/24 (2006.01)
F02D 41/28 (2006.01)

(52) U.S. Cl.
CPC ............... F02P 5/152 (2013.01); F02D 35/027 (2013.01); F02D 41/2416 (2013.01); F02D 2041/288 (2013.01); Y02T 10/46 (2013.01)
USPC ............... 701/111; 123/406.37; 73/35.05; 73/35.09

(58) Field of Classification Search
CPC ............ F02D 2041/288; F02D 35/027; F02D 41/2416; F02P 5/1518
USPC .................. 123/436, 406.16, 406.21, 406.29, 123/406.34–406.39, 435; 701/110, 111; 73/35.01–35.11, 114.07
See application file for complete search history.

(56) References Cited

U.S. PATENT DOCUMENTS

| 4,976,241 | A | * | 12/1990 | Ishida et al. | ............. | 123/406.37 |
| 5,408,863 | A | * | 4/1995 | Sawyers et al. | ............... | 73/35.05 |
| 7,909,018 | B2 | * | 3/2011 | Ishiguro et al. | .......... | 123/406.11 |
| 2005/0234633 | A1 | | 10/2005 | Takemura et al. | | |

(Continued)

FOREIGN PATENT DOCUMENTS

| CN | 1683911 | A | 10/2005 |
| CN | 101855440 | A | 10/2010 |

(Continued)

OTHER PUBLICATIONS

Chinese Office Action, issued Jan. 16, 2014, Patent Application No. 2011103307944.

(Continued)

*Primary Examiner* — Erick Solis
*Assistant Examiner* — Carl Staubach
(74) *Attorney, Agent, or Firm* — Sughrue Mion, PLLC; Richard C. Turner

(57) ABSTRACT

A knock control device is provided in which erroneous knock detection can be reduced by suppressing sudden knock signal changes due to noise, without causing any increase in the number of matching steps, deterioration in the S/N in knock detection and decrease in detection performing frequency. In the knock control device, an open gain is applied to the detected signal only during a knock detection window set in advance by a knock window setting means. The window corresponds to a period in which vibration due to knock arises. During other periods, either a closed gain or an interpolated gain value is applied to the detected signal.

28 Claims, 11 Drawing Sheets

(56) References Cited

U.S. PATENT DOCUMENTS

2009/0118989 A1   5/2009   Padhi et al.
2009/0158816 A1   6/2009   Kaneko et al.
2011/0118960 A1   5/2011   Komatsu et al.

FOREIGN PATENT DOCUMENTS

| CN | 101910596 A | 12/2010 |
|---|---|---|
| DE | 10215959 A1 | 10/2003 |
| JP | 06331501 A | 12/1994 |
| JP | 07-332150 A | 12/1995 |
| JP | 2006112403 A | 4/2006 |
| JP | 2008-215142 A | 9/2008 |
| JP | 4363171 B2 | 11/2009 |

OTHER PUBLICATIONS

Communication dated Dec. 2, 2014, issued by the Japan Patent Office in corresponding Japanese Application No. 2011-017896.

* cited by examiner

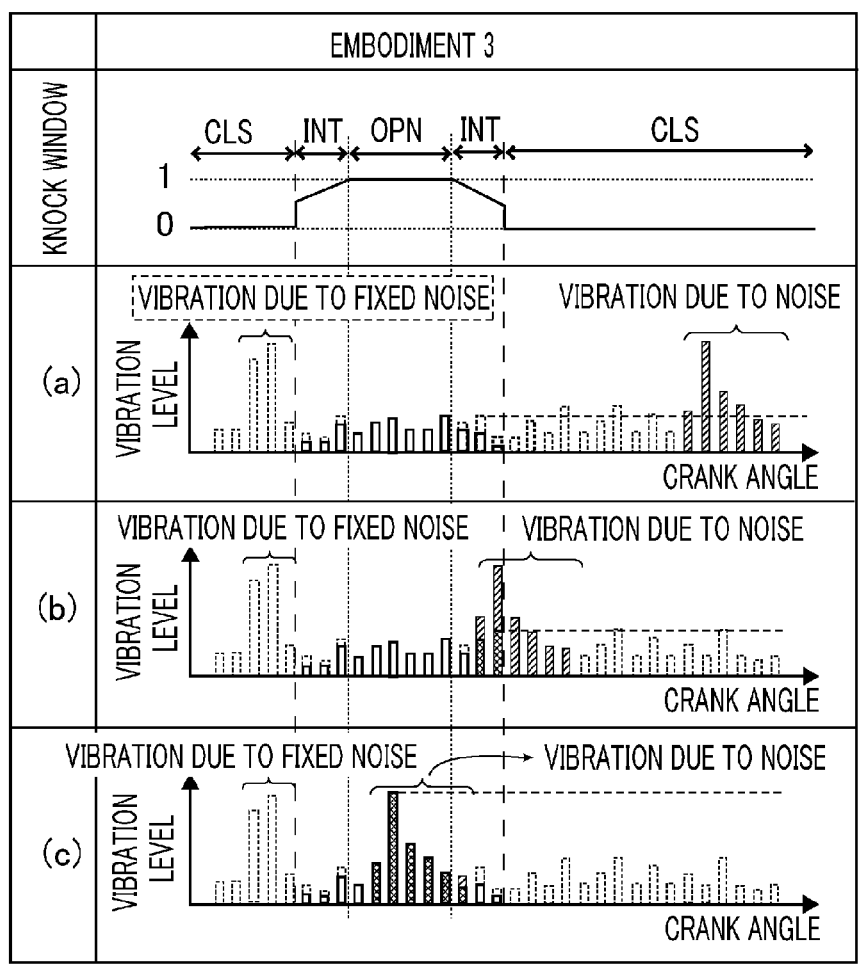

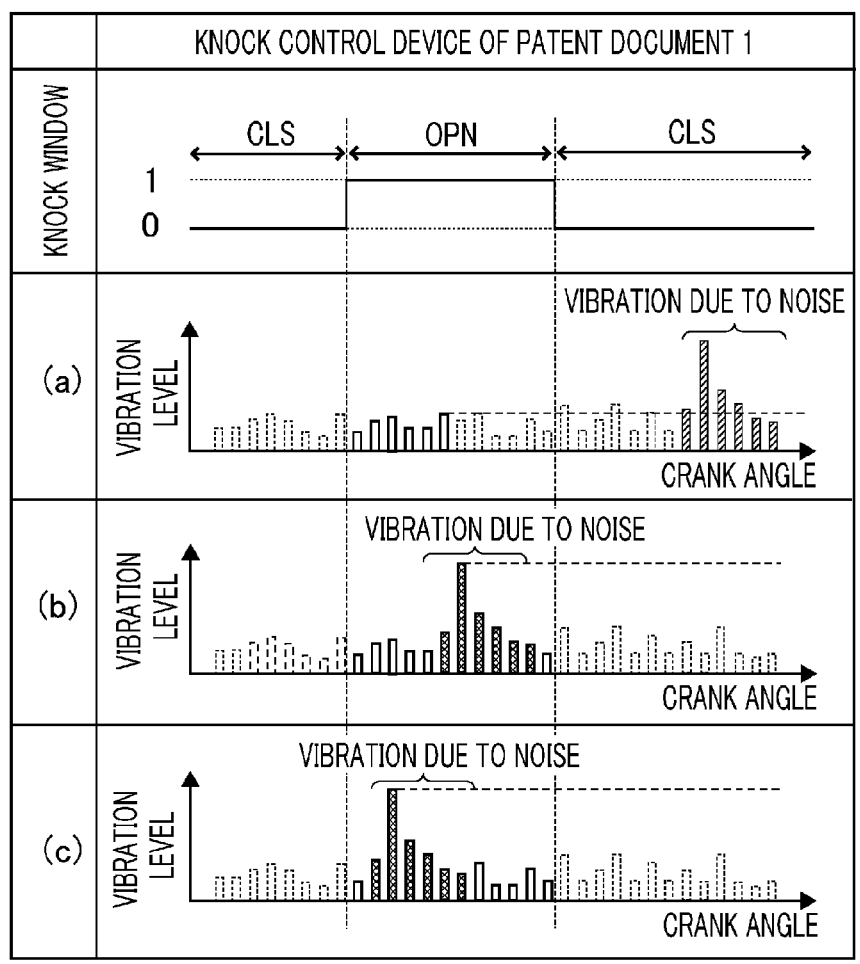

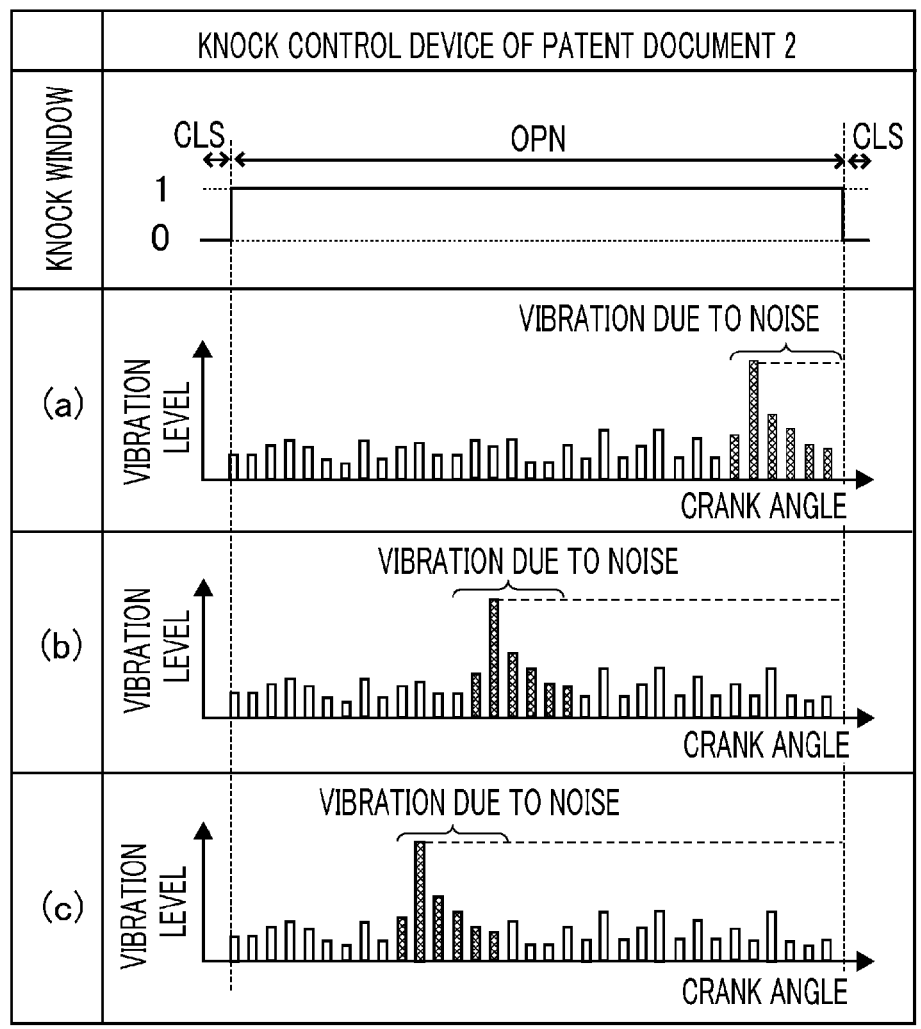

KNOCK CONTROL DEVICE FOR ENGINE

BACKGROUND OF THE INVENTION

1. Field of the Invention

The present invention relates to a knock control device for controlling knock occurring in an engine.

2. Description of the Related Art

There is conventionally known a method of detecting a knock phenomenon occurring in an engine by a vibration sensor (hereinafter referred to as a knock sensor) directly mounted on the engine block. It is known that when knock occurs in an engine in operation, a vibration in a specific frequency band arises in a combustion process depending on the bore of the engine and the vibration mode of the knock. This method is to perform, using digital signal processing such as a DFT (discrete Fourier transform), a time-frequency analysis of output from the knock sensor during a period (hereinafter referred to as a knock detection period) that is set in advance and in which vibration is expected to occur due to the knock, thereby calculating a vibration intensity (hereinafter referred to as a knock signal) and detecting the knock based on the calculated knock signal.

The knock is detected based on whether or not the knock signal exceeds a knock determination threshold value; the knock determination threshold value is generally known to be set using a gain and an offset matched in advance with an average value of the knock signal calculated through filtering processing or to be set using the average value of the knock signal and its standard deviation calculated through the filtering processing. Here, the latter will be explained using Equation 1 to Equation 4.

A knock determination threshold value VTH is calculated as follows: Firstly, an average value VBGL of a knock signal VP is calculated through smoothing processing shown by Equation 1, secondly, a variance VVAR of the knock signal VP is calculated through smoothing processing shown by Equation 2 using the average value VBGL and the knock signal VP, and after that, a standard deviation VSGM of the knock signal VP is calculated by calculating the square root of the variance as shown by Equation 3. Then a value obtained by multiplying the standard deviation VSGM by a predetermined coefficient KTH is added to the average value VBGL as shown by Equation 4, so that the knock determination threshold value VTH is calculated.

$$VGBL[n] = KBGL \times VP[n-1] - (1-KBGL) \times VP[n] \quad \text{Equation 1}$$

where VP is the knock signal; KBGL, a filter coefficient; and n, a stroke number.

$$VVAR[n] = KVAR \times VVAR[n-1] - (1-KVAR) \times \{(VP-VBGL)[n]\}^2 \quad \text{Equation 2}$$

where VVAR is the variance of the knock signal; KVAR, a filter coefficient for calculating the variance; and n, the stroke number.

$$VSGM[n] = (VVAR[n])^{1/2} \quad \text{Equation 3}$$

where VSGM is a standard deviation of the knock signal.

$$VTH = VBGL - KTH \times VSGM \quad \text{Equation 4}$$

where VTH is the knock determination threshold value; and KTH, a knock determination threshold value coefficient.

Here, high frequency components are removed from the knock signal VP using a filter coefficient of some 0.95 for each equation, and in addition, when the operation is in a transient state, those filter coefficients are set to smaller than 0.95 for quickly following a knock signal change; meanwhile when the knock is detected, they are set to larger than 0.95 for slowly following the change. Moreover, the knock determination threshold value coefficient KTH is set in advance in such a way that when the knock does not occur, the knock determination threshold value VTH becomes larger than the knock signal VP, whereas when it occurs, the value VTH becomes smaller than the knock signal VP.

Moreover, there is known another nock control device in which when the knock is detected, ignition timing is corrected to shift toward the retard side so as to suppress the knock, whereas when no knock is detected, the ignition timing is returned to the advance side so that torque reduction can be minimized. It is known from general engine characteristics that when the ignition timing is advanced, the knock is easy to occur although output torque from the engine increases, whereas when the ignition timing is retarded, the knock is hard to occur although the output torque from the engine decreases. With this in mind, the nock control device controls the engine in such a way that when the knock is detected, the ignition timing is corrected to shift toward the retard side, whereas when no knock is detected, the ignition timing is returned to the advance side, so that the engine is operated at a knock limit ignition timing that gives maximum torque while suppressing a knock occurrence. However, when the engine is operated under low load, the knock sometimes does not occur even if the ignition timing is advanced to the timing that gives the maximum torque; therefore the above-described knock control is not needed in such an operation range.

In recent years, there have been put into practical use a cylinder injection type engine that, with an injector provided inside a cylinder thereof, injects fuel directly into the cylinder and an engine that is provided with a variable intake/exhaust valve mechanism capable of variably controlling opening/closing timing of the intake and exhaust valves depending on the engine operation state. Particularly in such engines as above, a vibration attributed to fuel injection by the injector (hereinafter referred to as injector noise) and that attributed to the opening/closing of the intake and exhaust valves (hereinafter referred to as valve noise) are easily superimposed on the knock signal.

Furthermore, since the injection timing of the injector and the opening/closing timing of the intake and the exhaust valves are altered in various ways, it is difficult to prevent those kinds of noise from coming in and out of the knock detection period. In a conventional control device, if the noise of those kinds comes in and out of the knock detection period, the knock signal level suddenly changes, and the knock determination threshold value calculated through the filtering processing slowly follows the change; therefore, there has been a problem in that the knock is erroneously detected occurring although no knock occurs.

Meanwhile, a method is proposed in Patent Document 1 in which when the injector noise is superimposed on the proximity of the knock detection period, the knock detection period is altered so that the injector noise is completely included in the period, whereby whether the injector noise is inside the knock detection period or thereoutside is detected separately, the extent of change in the knock signal level due to the injector noise coming in and out is accurately predicted, and the knock determination threshold value is raised depending on the injector noise coming in and out of the period. Moreover, another method is proposed in Patent Document 2, in which the knock detection period is set so as to always include the valve noise, thereby preventing the knock signal from suddenly changing due to the valve noise coming in and out of the period, so that erroneous knock detection can be avoided.

Patent Document 1: Japanese Patent No. 4363171
Patent Document 2: Japanese Laid-Open Patent No. 2008-215142

According to a knock control device of Patent Document 1, although an effect of suppressing erroneous knock detection can be brought about even if the knock signal level changes due to the injector noise coming in and out of the period, the knock signal level itself changes when the injector noise comes in and out of the knock detection period; therefore, processing of raising the knock determination threshold value or processing of prohibiting control of avoiding the knock must be executed. When the knock determination threshold value is raised, the raising quantity needs to be set with some margin taking into consideration fluctuation of the noise level, which has therefore caused a problem in that knock detection is omitted occasionally, and furthermore, when the knock avoiding control is prohibited, there has been another problem in that the knock occurring during the prohibition cannot be detected.

Furthermore, when the knock detection period is expanded, the knock is detected even when noise is superimposed outside a knock occurring period in which the knock does not originally need to be detected; therefore, there has been a problem in that when the vibration level due to the knock is lower than that due to the noise, the knock detection is omitted. Moreover, there has been another problem in that the knock is erroneously detected or the knock detection is omitted for reasons of including in the knock detection period unnecessary noise other than the injector and valve noise.

Moreover, according to a knock control device of Patent Document 2, an effect can be brought about in which erroneous knock detection can be avoided without causing any change in the knock signal level, by avoiding noise itself from coming in and out; however, the knock detection period is expanded to wider than that in Patent Document 1, thereby causing a problem in that the knock detection is omitted when the vibration level due to the knock is constantly lower than that due the noise. Moreover, there has been another problem in that unnecessary noise other than the injector and valve noise is likely to be included in the knock detection period, so that the knock is erroneously detected or knock detection is omitted.

Problems with a conventional knock control device will be explained using FIG. 7A to FIG. 7C and FIG. 8A to FIG. 8C. Here, the explanation will be made on when the conventional device has the same configuration as that of the present invention except for a method of setting a knock window.

FIG. 7A to FIG. 7C each are a diagram showing a spectrum after the digital signal processing in the combustion process, in which (a) to (c) represent noise-superimposed states differing from each other.

Each of (a) to (c) shows a state as follows:
(a): a state in which noise is superimposed on a position distant from a period in which the knock is likely to occur.
(b): a state in which noise is superimposed on the proximity of the period in which the knock is likely to occur.
(c): a state in which noise is superimposed on the period in which the knock is likely to occur.

In each state, a peak-hold value of the spectrum in the knock detection period is calculated as a knock signal.

FIG. 8A to FIG. 8C each are a time chart showing moves of the knock signal average value VBGL and the knock determination threshold value VTH when the noise-superimposed state changes from (a) to (b) to (c).

FIG. 7A and FIG. 8A show the operation of the conventional knock control device. In the conventional knock control device, noise is superimposed outside the knock detection period (closed periods CLS) in (a) and (b) of FIG. 7A; meanwhile in (c) of FIG. 7A, noise is superimposed on the knock detection period OPN (open period OPN). In FIG. 8A, the noise is superimposed on the knock detection period OPN at time T2, and after that, the knock signal VP suddenly increases toward the vibration level due to the noise; however, since the knock determination threshold value VTH that is obtained through smoothing processing of the knock signal VP is calculated with a certain time lag, the knock signal VP exceeds the knock determination threshold value VTH although no knock occurs after time T2, thereby causing erroneous noise detection.

FIG. 7B and FIG. 8B show the operation of the knock control device according to Patent Document 1. In the knock control device according to Patent Document 1, noise is superimposed outside the knock detection period (closed periods CLS) in FIG. 7B (a); meanwhile in FIG. 7B (b), noise existing in the proximity of the knock detection period OPN is detected and the knock detection period OPN is thereby expanded; therefore, the noise is superimposed on the knock detection period OPN, and in FIG. 7B (c), noise is also superimposed on the knock detection period OPN. In FIG. 8B, the noise is superimposed on the knock detection period OPN at time T1 that is earlier timing than time T2 in FIG. 8A, and after that, the knock signal VP suddenly increases toward the vibration level due to the noise. However, level-raising processing is executed on the period between T1 and T1', and the knock determination threshold value VTH is raised so that a knock determination threshold value VTH' is calculated, whereby erroneous knock detection can be suppressed. However, the knock determination threshold value is set at an inappropriate level in some cases by the setting of the value VTH', which causes omission of knock detection. Moreover, when a vibration level due to the knock, VKNK, is the same as the level shown in the figure, for example, the knock cannot be detected after time T1.

FIG. 7C and FIG. 8C show the operation of the knock control device according to Patent Document 2. In the knock control device according to Patent Document 2, the knock detection period OPN is set so as to always include noise thereinside; therefore, the noise is superimposed on the knock detection period OPN in all of (a) to (c) in FIG. 7C. In FIG. 8C, since the knock signal is always held at the vibration level due to the noise, the signal does not suddenly change, thereby avoiding erroneous knock detection. However, when the vibration level due to the knock, VKNK, is the same as the level shown in the figure, for example, the knock cannot be detected at any time.

SUMMARY OF THE INVENTION

In view of the above, the present invention aims at providing a knock control device in which erroneous knock detection can be suppressed, without causing any increase in the number of matching steps, deterioration in S/N in the knock detection and decrease in detection performing frequency, by suppressing a sudden change in the knock signal when various kinds of noise come in and out of the knock detection period.

A knock control device for an engine according to the present invention comprises: a knock sensor for detecting vibration due to knock of the engine; a digital signal processing means for performing a time-frequency analysis based on output from the knock sensor during a digital signal processing period set in advance; a knock window setting means for calculating as a knock signal a peak-hold value in a knock window set in advance with respect to the processing result by the digital signal processing means and for calculating as a knock signal position a position where the knock signal is calculated; a knock detection means for calculating a knock determination threshold value using the knock signal and for detecting the knock by comparing the calculated knock determination threshold value with the knock signal; and a knock suppression means for suppressing the knock based on the detection result by the knock detection means and the knock signal position; wherein the knock window setting means sets in advance as a knock detection period (open period) a period in which the vibration due to the knock arises, multiplies the processing result by the digital signal processing means by an open gain in the knock detection period and multiplies the processing result by the digital signal processing means by a closed gain in periods outside the knock detection period (closed periods), in addition, a predetermined interpolation period is provided between the open period and each closed period, and in the interpolation period, the means multiplies the processing result by the digital signal processing means by a linear interpolation value between the open gain and a predetermined interpolation gain.

According to the present invention, an interpolation period is provided between the knock detection period (open period) and each closed period, and by multiplying a signal in the interpolation period by a linear interpolation value between the open gain (=1) and a predetermined interpolation gain, a sudden knock signal change occurring when injector noise, valve noise and the like come in and out of the knock detection period can be suppressed, so that erroneous knock detection due to the knock determination threshold value slowly following the knock signal can be suppressed.

Furthermore, since the vibration level due to noise is corrected so as to gradually increase in the interpolation period, even when the noise exists in the interpolation period, the knock can be accurately detected as far as the vibration level due to the noise does not exceed that due to the knock.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 5A to FIG. 5C each are an explanatory diagram showing the operation of a knock control device according to each of the embodiments of the invention, where the operations of Embodiment 1, Embodiment 2 and Embodiment 3 are explained in FIG. 5A, FIG. 5B and FIG. 5C, respectively;

FIG. 6A, FIG. 6B and FIG. 6C show a knock signal average value (VBGL) and a knock determination threshold value (VTH) of Embodiment 1, Embodiment 2 and Embodiment 3, respectively;

FIG. 7A to FIG. 7C each are a diagram showing a noise-superimposed state in a combustion process in conventional knock control devices;

DETAILED DESCRIPTION OF THE PREFERRED EMBODIMENTS

Embodiment 1

Figure 1:
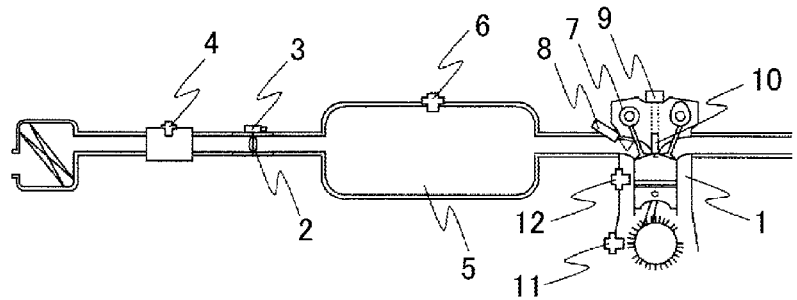
FIG. 1 is a configurational diagram schematically showing an engine according to Embodiment 1 of the present invention.
Figure 2:
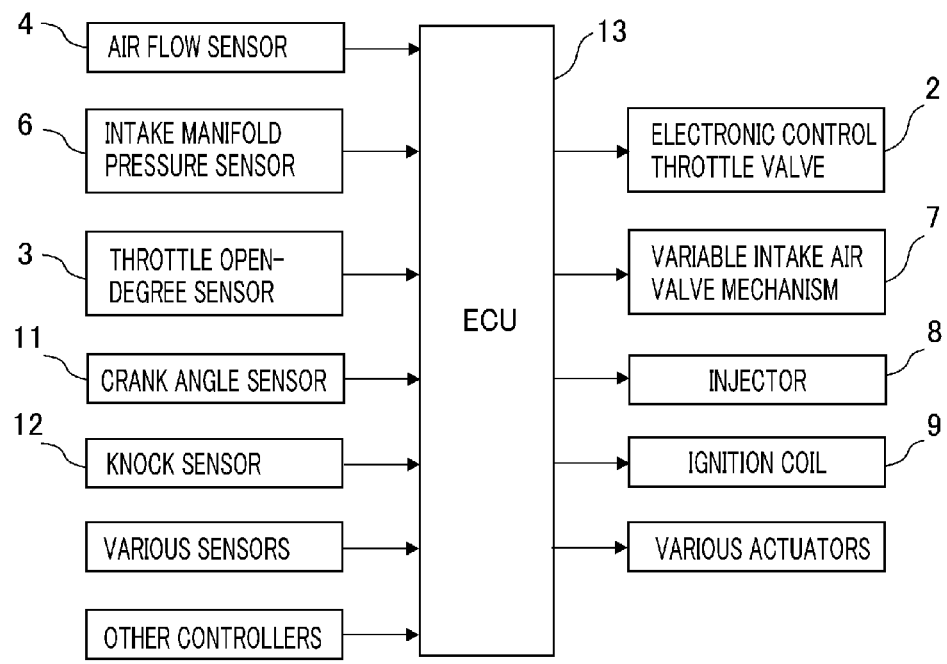
FIG. 2 is a configurational diagram schematically showing an engine control unit according to Embodiment 1 of the invention.

Hereinafter, Embodiment 1 of the present invention will be explained in detail referring to the accompanied drawings. FIG. 1 and FIG. 2 are configurational diagrams schematically showing an engine and a control unit for the engine according to Embodiment 1 of the invention.

In FIG. 1, upstream of the intake air system of the engine 1 is provided an electronic control throttle valve 2 that is electronically controlled to adjust its intake air volume. In addition, a throttle opening-degree sensor 3 is provided for measuring an opening degree of the electronic control throttle valve 2. Instead of the electronic control throttle valve 2, a mechanical type throttle valve may also be used that is connected by a wire directly to an accelerator pedal not shown in the figure.

Furthermore, an airflow sensor 4 for measuring the intake air volume is provided upstream of the electronic control throttle valve 2, and in the engine 1 side downstream of the electronic control throttle valve 2 is provided an intake manifold pressure sensor 6 for measuring a pressure inside a surge tank 5. As for the airflow sensor 4 and the intake manifold pressure sensor 6, both or either of them may be provided.

On an intake air valve provided on an intake air port downstream of the surge tank 5 is mounted a variable intake air valve mechanism 7 capable of variably controlling opening/closing timing of the intake air valve, and in addition, on the intake air port is provided an injector 8 for injecting fuel. The injector 8 may also be provided so as to enable direct injection into a cylinder of the engine 1.

Furthermore, the engine 1 is provided with an ignition coil 9 and a spark plug 10 for igniting an air-fuel mixture, a crank angle sensor 11 for detecting a plate edge mounted on the crank shaft in order to detect a revolution speed of the engine and a crank angle, and a knock sensor 12 for detecting vibration of the engine.

In FIG. 2, to an electronic control unit (hereinafter referred to as an ECU) 13 are input the intake air volume measured by the airflow sensor 4, the intake manifold pressure measured by the intake manifold pressure sensor 6, the opening degree of the electronic control throttle valve 2 measured by the throttle opening-degree sensor 3, pulses output from the crank angle sensor 11, synchronized with the plate edge mounted on the crank shaft, and a vibration waveform of the engine measured by the knock sensor 12. In addition, values measured by various sensors other than those described above are also input to the ECU 13, and furthermore, signals from other controllers (control systems such as automatic transmission control, brake control and traction control) are also input thereto.

In the ECU 13, a target throttle opening degree is calculated based on an opening degree of the accelerator and an engine operation state, by which the electronic control throttle valve 2 is controlled. The variable intake air valve mechanism 7 for variably controlling the opening/closing timing of the intake air valve is controlled in accordance with the engine operation state at the time; the injector 8 is driven so as to achieve a target fuel-to-air ratio; and the ignition coil 9 is activated so as to achieve target ignition timing.

When knock is detected by a method to be described later, the target ignition timing is set in the retard side, thereby also taking control of suppressing a knock occurrence. Furthermore, values for instructing actuators other than those described above are also calculated.

Figure 3:
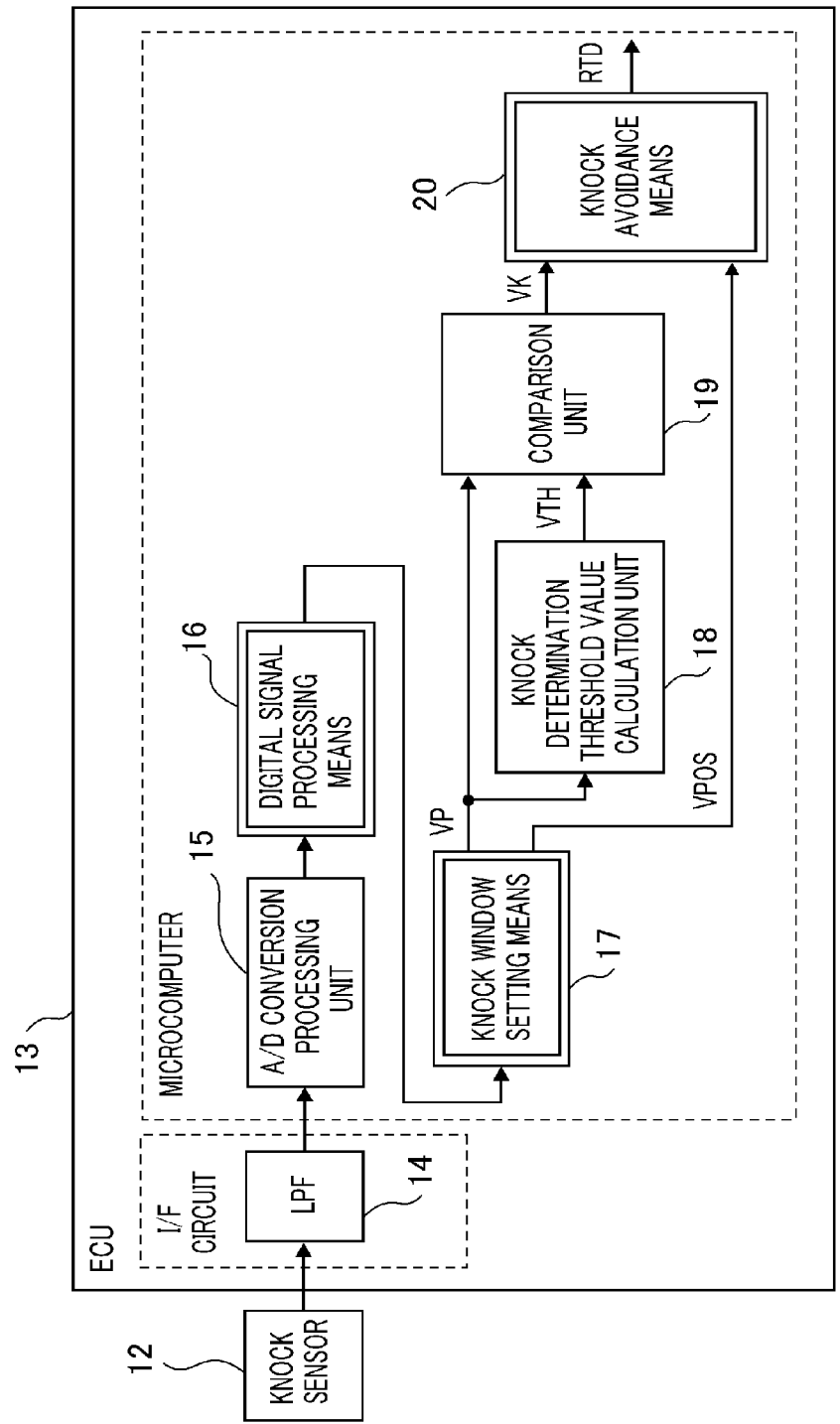
FIG. 3 is a block diagram schematically showing a knock control unit according to Embodiment 1 of the invention.

Next, an outline of knock control taken in the ECU 13 will be explained referring to FIG. 3. FIG. 3 is a block diagram showing a configuration of the entire knock control. In FIG. 3, the ECU 13 includes various I/F circuits and a microcomputer; the microcomputer includes an A/D converter for converting an analog signal into a digital signal, a ROM area for storing control programs and control invariables, a RAM area for storing variables when the programs are executed and so forth.

The reference numeral 14 denotes an I/F circuit for the knock control, which includes a low pass filter (LPF) for removing high frequency components of an output signal from the knock sensor. The reference numeral 15 denotes a processing unit for the A/D conversion executed by the A/D convertor of the microcomputer at constant intervals (such as once every 10 μs or once every 20 μs). The LPF 14 also functions in such a way that the A/D-converted signal is biased at, for example, 2.5 V (the center voltage of vibration components is set to 2.5 V) in order to take into the A/D conversion processing unit 15 all of the vibration components, and the vibration components are amplified with the center voltage held at 2.5 V so as to fall within 0 to 5 V when the components are not large enough, whereas they are attenuated with the center voltage held at 2.5 V when too large.

In addition, this A/D conversion is executed on a regular basis and only data for a period necessary for the digital signal processing (hereinafter referred to as a digital signal processing period), for example, from 10° CA BTDC to 80° CA ATDC, may be transmitted to the later stage of a digital signal processing means 16, or the A/D conversion is executed only on the digital signal processing period, and then the data may be transmitted to the later stage of the digital signal processing means 16.

Time-frequency analysis is performed in the digital signal processing means 16. A spectrum of knock natural frequency components is calculated for each predetermined time through this digital signal processing called such as a discrete Fourier transform or a short-time Fourier transform.

Moreover, the digital signal processing means may extract the knock natural frequency components using an IIR (infinite impulse response) filter or an FIR (finite impulse response) filter. Moreover, the digital signal processing means 16 needs to start the processing after the A/D conversion during the digital signal processing period has been completed, and finish the processing before crank-angle-synchronized interruption processing in which processing from a knock window setting means 17 to a knock avoidance means 20 to be described later (for example, interruption processing at 75° CA BTDC) is executed.

The knock window setting means 17 calculates a knock signal and the knock signal position, which are used in knock detection and knock avoidance afterward, from the spectrum calculated by the digital signal processing means 16.

Here, operations from the knock sensor until calculations of the knock signal and the knock signal position will be explained using FIG. 4.

Figure 4:
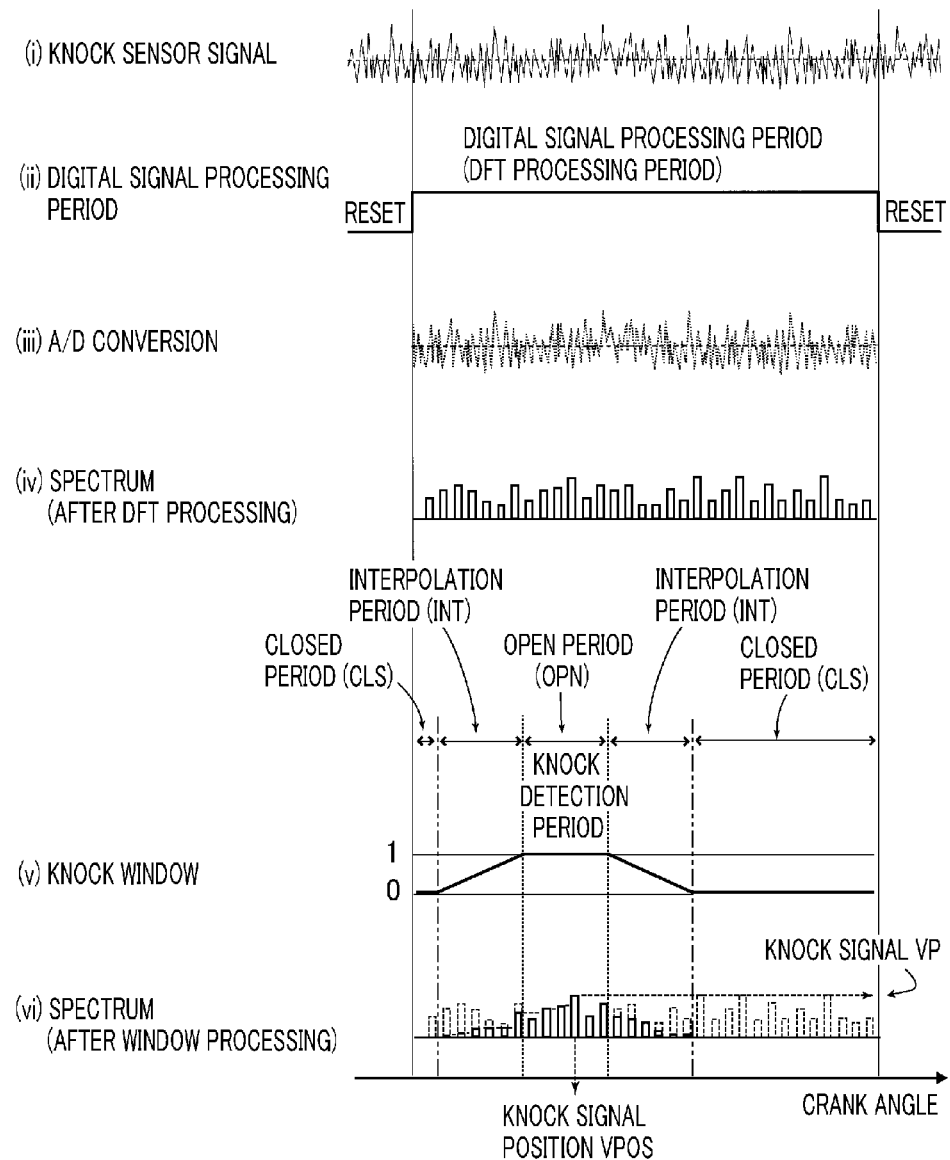
FIG. 4 is a diagram for explaining operations until calculation of a knock signal and the knock signal position by a knock window setting means according to Embodiment 1 of the invention.

As shown in FIG. 4, the A/D conversion processing is executed, for example, once every 20 μs on the knock sensor signal (refer to FIG. 4 (i)) in the digital signal processing period (refer to FIG. 4 (ii)). Next, a spectrum in a predetermined frequency band (refer to FIG. 4 (iv)) is calculated from the knock sensor signal for each predetermined crank angle using, for example, the discrete Fourier transform (DTF). Following that, a period in which vibration due to the knock occurs is set in advance as a knock detection period OPN (open period OPN), an interpolation period INT is set at each end of the knock detection period, and periods other than those are set as closed periods CLS. Moreover, the open gain is set to 1 in the open period OPN, the closed gain is set to 0 in the closed periods CLS, and the interpolation gain is set to a linear interpolation value between the open gain and a predetermined interpolation gain in the interpolation period INT. Here, explanation will be made on a case in which the predetermined interpolation gain is set to 0 (refer to FIG. 4 (v)). The calculated spectrum shown in (iv) of FIG. 4 is multiplied by the knock window set in (v) of FIG. 4, a peak-hold value of the resultant multiplied spectrum is calculated as a knock signal VP, and the position where the knock signal VP is calculated is obtained as a knock signal position VPOS (refer to FIG. 4 (vi)).

The following knock determination threshold value calculation unit 18 and comparison unit 19 constitute a knock detection means. The knock determination threshold value calculation unit 18 calculates a knock determination threshold value VTH used for the later comparison, using the knock signal VP calculated on a stroke basis, base on the following Equation (1) to Equation (4).

$$VBGL[n]=KBGL \times VP[n-1]-(1-KBGL) \times VP[n] \quad (1)$$

where VBGL is an average value of the knock signal VP; VP, the knock signal; KBGL, a filter coefficient; and n, a stroke number.

$$VVAR[n]=KVAR \times VVAR[n-1]-(1-KVAR) \times \{(VP-VBGL)[n]\}^2 \quad (2)$$

where VVAR is a variance of the knock signal VP; KVAR, a filter coefficient for calculating the variance; and n, the stroke number.

$$VSGM[n]=(VVAR[n])^{1/2} \quad (3)$$

where VSGM is a standard deviation of the knock signal VP.

$$VTH=VBGL-KTH \times VSGM \quad (4)$$

where VTH is the knock determination threshold value; and KTH, a knock determination threshold value coefficient.

Here, high frequency components are removed from the knock signal VP using a filter coefficient of some 0.95 used for each equation, and in addition, when the operation is in a transient state, the filter coefficient is set to smaller than 0.95 for quickly following a knock signal change; meanwhile when knock determination is made, the coefficient is set to larger than 0.95 for slowly following the change.

Moreover, the value of the knock determination threshold value coefficient KTH is set in advance in such a way that when the knock does not occur, the knock determination threshold value VTH becomes larger than the knock signal VP, whereas when it occurs, the value VTH becomes smaller than the knock signal VP.

The comparison unit 19 determines a knock occurrence by comparing the knock signal VP with the knock determination threshold value VTH using Equation (5) and then calculates a knock intensity VK.

$$VK[n]=\max\{(VP[n]-VTH[n])/(VP[n]-VBGL[n]),0\} \quad (5)$$

where VK is the knock intensity, and if VK>1, a knock occurrence is determined.

As for the following knock avoidance means 20, its operation of avoiding the knock by retarding ignition timing will be explained as follows:

First, a retard angle ΔRTD is calculated, using Equation (6), in accordance with the knock intensity for each ignition.

ΔRTD[n]=VK[n]×KRTD if VK[n]>1 and VPOS is within the knock detection period, $$\Delta RTD[n]=0 \text{ otherwise.} \quad (6)$$

where ΔRTD is a retard quantity for each ignition; and KRTD, a retard quantity reflection coefficient.

Here, the retard quantity for each ignition ΔRTD is calculated only when the knock signal position VPOS is within the knock detection period when a knock occurrence is determined by the knock determination means.

Next, a knock correction quantity RTD is calculated by the following Equation (7).

$$RTD[n]=RTD[n-1]-\Delta RTD[n] \text{ if } \Delta RTD[n]>0,$$

$$RTD[n]=RTD[n-1]-\Delta ADV \text{ otherwise.} \quad (7)$$

where RTD is the knock correction quantity; and ΔADV, an advance quantity.

Here, both retard quantity for each ignition ΔRTD and knock correction value RTD are made positive in the advance side and negative in the retard side.

Last, the knock occurrence is avoided by correcting the engine ignition timing based on the knock correction quantity RTD. The outline of the method of processing for realizing the knock control is as has been explained above.

Following the above, the operation when noise is actually superimposed on the knock window in this Embodiment will be explained in detail using FIG. 5A to FIG. 5C and FIG. 6A to FIG. 6C.

Figure 5A:
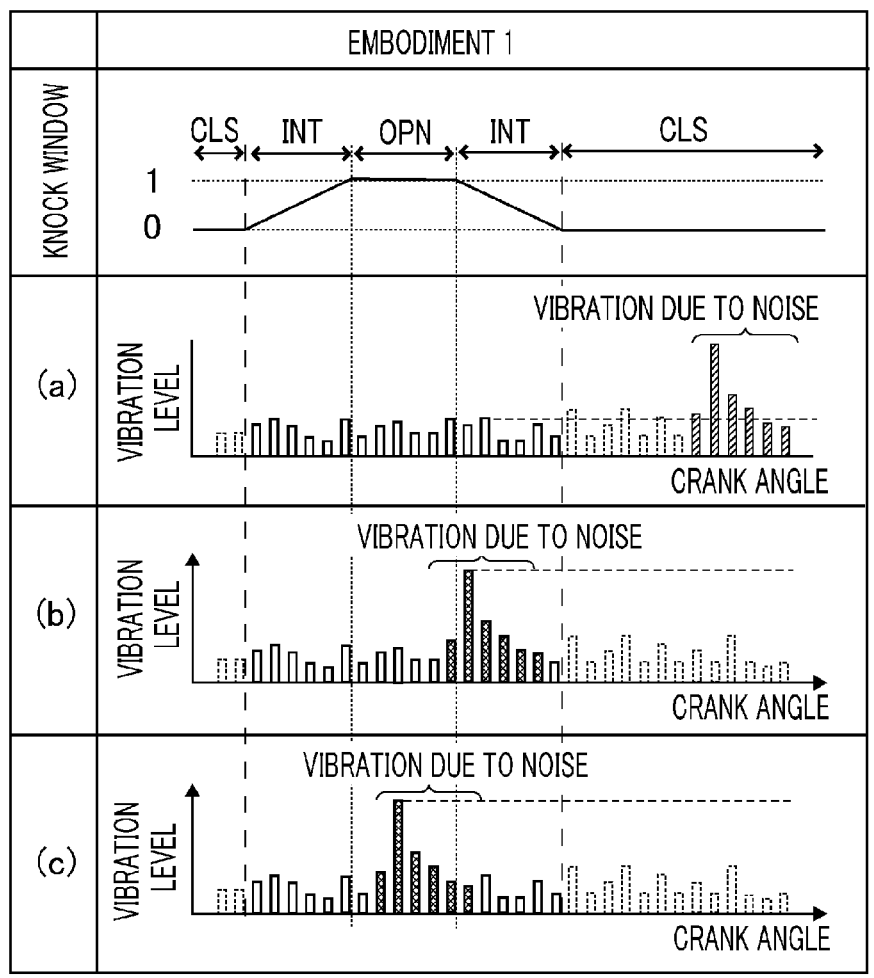
Figure 5B:
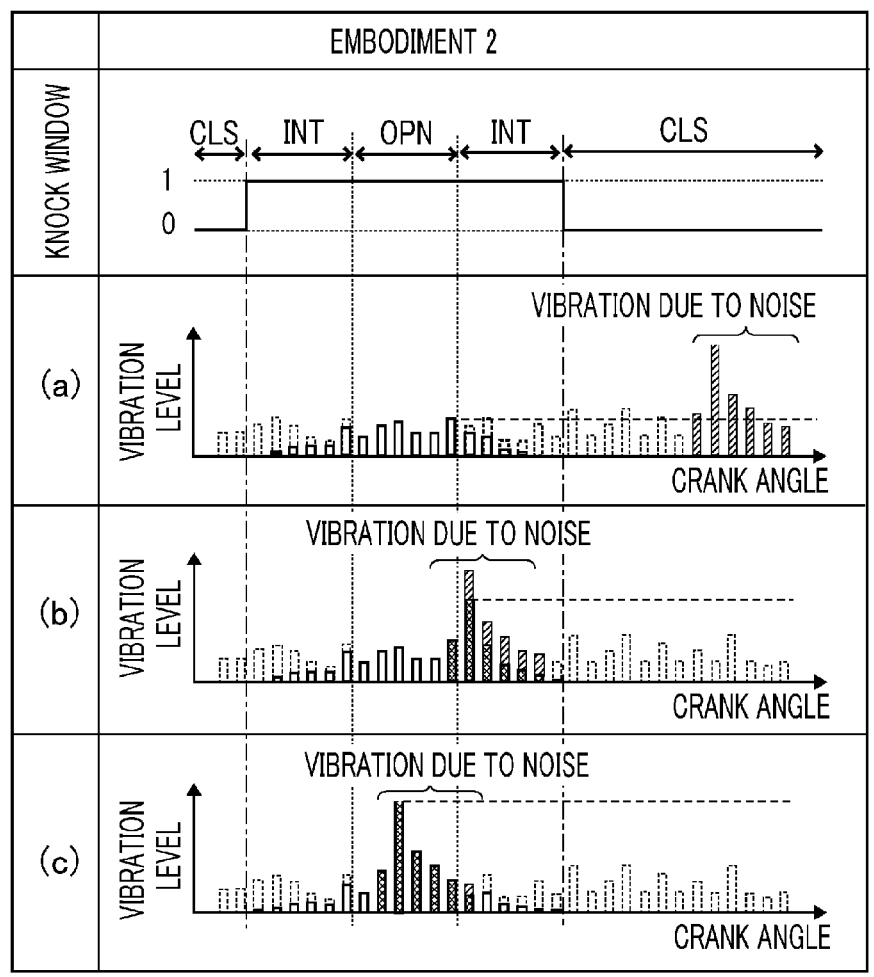

FIG. 5A to FIG. 5C each are a diagram showing a spectrum after the digital signal processing has been executed in a combustion process, in which (a) to (c) represent different noise-superimposed states as follows:

(a): a state in which noise is superimposed on a position distant from a period in which the knock is likely to occur.

(b): a state in which noise is superimposed on the proximity of the period in which the knock is likely to occur.

(c): a state in which noise is superimposed on the period in which the knock is likely to occur.

In each state, a peak-hold value of the spectrum in the knock detection period is calculated as a knock signal.

Figure 6A:
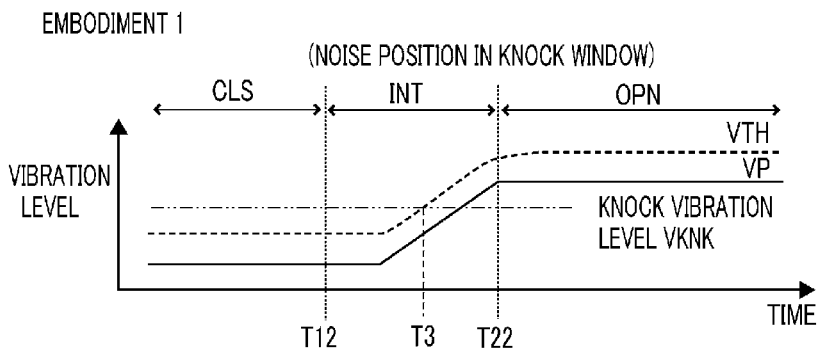
FIG. 6A to FIG. 6C each are a time chart showing the operation of a knock control device according to each of the embodiments of the invention, where
Figure 6B:
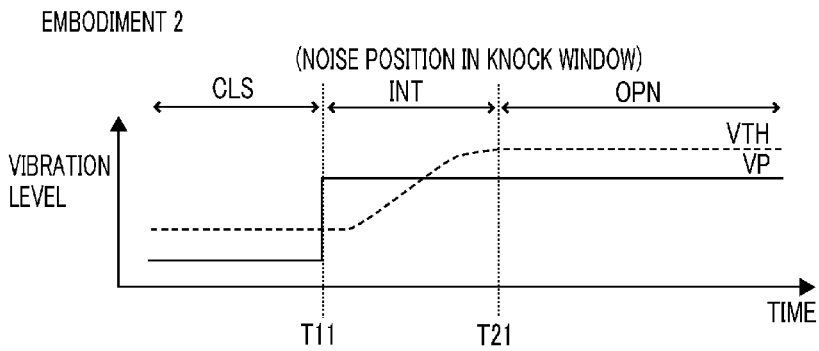
Figure 6C:
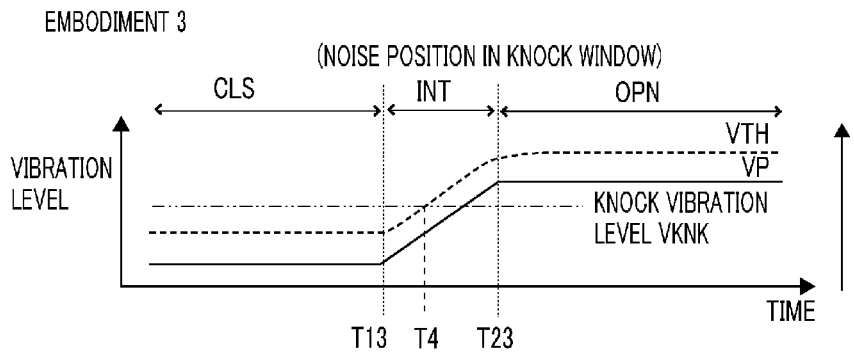
Figure 7A:
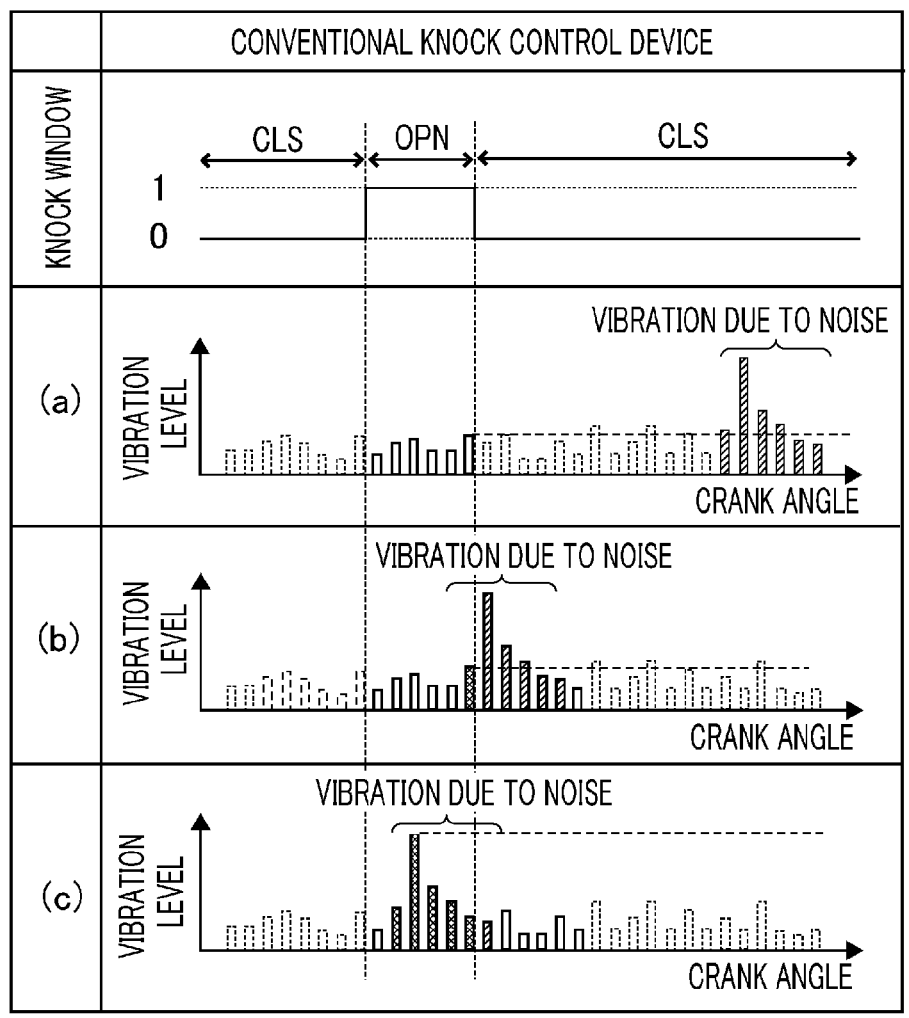
Figure 8A:
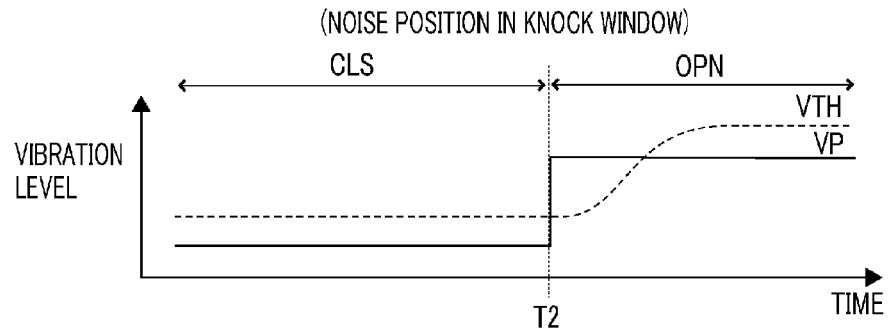
FIG. 8A to FIG. 8C each are a time chart showing moves of a knock signal average value (VBGL) and a knock determination threshold value (VTH) in the conventional knock control devices.
Figure 8B:
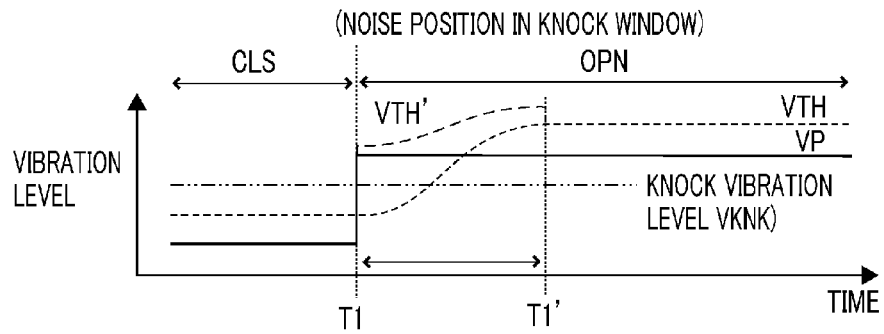
Figure 8C:
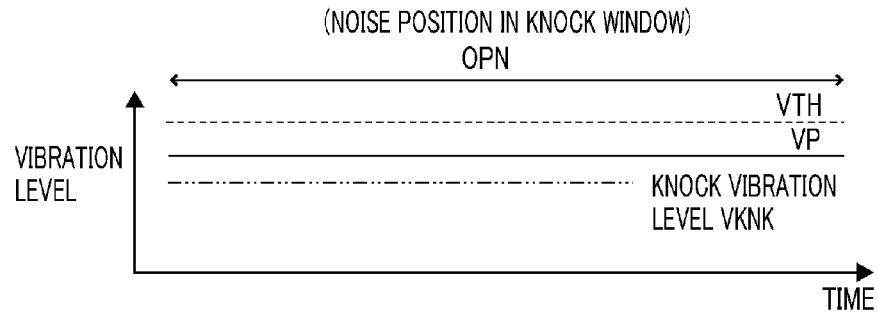

FIG. 6A to FIG. 6C each show a time chart representing moves of the average value VBGL of the knock signal VP and the knock determination threshold value VTH when the noise-superimposed state shifts from (a) to (b) to (c). FIG. 5A and FIG. 6A show the operation according to Embodiment 1 of the present invention.

In Embodiment 1, the interpolation gain is set to 0, which is the same as the closed gain set in the closed periods CLS. Noise is superimposed on the closed periods CLS in FIG. 5A (a), on the interpolation period INT in FIG. 5A (b), and on the open period OPN in FIG. 5A (c).

In FIG. 6A, the noise is superimposed on the interpolation period ITN at time T12, and after that, the noise is superimposed on the knock detection period OPN at time T22; however as described above, since a linear interpolation value between 1 and 0 is set in the interpolation period in the knock window according to Embodiment 1, the knock signal VP gradually increases as the noise comes close to the knock detection period OPN; therefore, the calculation delay of the knock determination threshold value VTH due to a sudden increase in the knock signal VP can be suppressed, so that erroneous knock detection can be suppressed. Furthermore, when a vibration level due to the knock, VKNK, is the same as that shown in the figure, for example, the knock can be detected until time T3.

Embodiment 2

Next, FIG. 5B and FIG. 6B show the operation of a knock control device according to Embodiment 2 of the present invention.

In Embodiment 2, the interpolation gain is set to 1, which is the same as the open gain set in the knock detection period OPN. Noise is superimposed on the closed periods CLS in FIG. 5B (a), on the interpolation period INT in FIG. 5B (b), and on the open period OPN in FIG. 5B (c).

In FIG. 6B, the noise is superimposed on the interpolation period INT at time T11, and after that, superimposed on the knock detection period OPN at time T21. At time T11 when the noise is superimposed on the interpolation period ITN, the knock signal VP suddenly increases toward the vibration level due to the noise, and the knock determination threshold value VTH that is calculated through smoothing processing of the knock signal VP is calculated with a certain time lag. Therefore, the knock signal VP exceeds the knock determination threshold value VTH after time T11 although the knock does not occur; however, when the noise-superimposed position is within the interpolation period ITN, the correction quantity RTD is not calculated by the knock avoidance means 20 even if the knock signal VP exceeds the knock determination threshold value VTH, so that the knock is not detected erroneously.

Embodiment 3

FIG. 5C and FIG. 6C show the operation of a knock control device according to Embodiment 3 of the present invention. In Embodiment 3, the interpolation gain is set in such a way that the vibration level due to noise coming in and out of the knock detection period becomes nearly the same as that due to combustion other than the knock at least in the knock detection period. Noise is superimposed on the closed periods CLS in FIG. 5C (a), on the interpolation period INT in FIG. 5C (b), and on the open period OPN in FIG. 5C (c).

Moreover, by setting the interpolation gain in such a way that the vibration level due to the noise becomes the same as that in the knock detection period OPN, the interpolation period can be set narrower than that set in Embodiment 2 described above, so that fixed noise that is specifically attributed to the engine and its operation state and occurs at nearly a fixed position as shown in FIG. 5C can be removed.

In FIG. 6C, the noise is superimposed on the interpolation period ITN at time T13, and after that, the noise is superimposed on the knock detection period OPN at time T23; however as described above, since a linear interpolation value between 1 and a predetermine interpolation gain (for example 0.5) is set in the interpolation period in the knock window according to Embodiment 3, the knock signal VP gradually increases as the noise comes close to the knock detection period OPN; therefore, the calculation delay of the knock determination threshold value VTH due to a sudden increase in the knock signal VP can be suppressed, so that erroneous knock detection can be suppressed. Furthermore, when the vibration level due to the knock, VKNK, is the same as that shown in the figure, for example, the knock can be detected until time T4.

As described above, according to a knock control device of the present invention, the knock window setting means 17 sets in advance as a knock detection period (open period OPN) a period in which vibration due to the knock occurs, multiplies the processing result by the digital signal processing means 16 by an open gain in the knock detection period and multiplies the processing result by the digital signal processing means 16 by a closed gain in the periods other than the knock detection period (closed periods CLS), in addition, a predetermined interpolation period INT is provided between the open period OPN and each of the closed periods CLS, and in the interpolation period INT, the processing result by the digital signal processing means 16 is multiplied by a linear interpolation value between the open gain and a predetermine interpolation gain. Therefore, since a sudden change in the knock signal level does not occur even when various kinds of noise come in and out of the knock detection period, erroneous knock detection due to the knock determination threshold value slowly following the change can be suppressed, and in addition, since the knock detection period is not unnecessarily expanded, an excellent effect can be expected in which erroneous knock detection outside the knock detection period can be avoided, and as a result, knock controllability can be enhanced.

Moreover, although explanations have been made on the interpolation period at the back end of the knock detection period in each embodiment described above, the same configuration can be applied to the front end of the knock detection period, thereby bringing about the same effect.

Moreover, in a state in which different noise is superimposed before and after the knock detection period, the interpolation period is set individually at the front and back ends of the knock detection period, whereby erroneous knock detection due to the noise can be more accurately suppressed.

Moreover, since the noise superimposed in the combustion process varies depending also on an operation state, setting the interpolation period and the interpolation gain depending on at least one of an engine revolution speed and an engine load can more accurately suppress erroneous knock detection due to the noise.

The foregoing and other object, features, aspects and advantages of the present invention will become more apparent from the following detailed description of the present invention when taken in conjunction with the accompanying drawings.

What is claimed is:

1. A knock control device for an engine, comprising:
   a knock sensor that detects vibration due to knock of the engine;
   a digital signal processing unit that performs a time-frequency analysis based on output from the knock sensor during a digital signal processing period set in advance;
   a knock window setting unit that calculates as a knock signal a peak-hold value in a knock window set in advance with respect to the processing result by the digital signal processing unit and calculates as a knock signal position a position where the knock signal is calculated;
   a knock detection unit that calculates a knock determination threshold value using the knock signal and detects the knock by comparing the calculated knock determination threshold value with the knock signal; and
   a knock suppression unit that suppresses the knock based on the detection result by the knock detection unit and the knock signal position; wherein
   the knock window setting unit sets in advance as a knock detection period (open period) a period in which the vibration due to the knock arises, multiplies the processing result by the digital signal processing unit by an open gain in the knock detection period and multiplies the processing result by the digital signal processing unit by a closed gain in periods outside the knock detection period (closed periods), in addition, a predetermined interpolation period is provided between the open period and each closed period, and in the interpolation period, the unit multiplies the processing result by the digital signal processing unit by a linear interpolation value between the open gain and a predetermined interpolation gain.

2. A knock control device for an engine according to claim 1, wherein the knock suppression unit takes suppression control only when a knock occurrence is determined from the detection result by the knock detection unit and the knock signal position is within the knock detection period.

3. A knock control device for an engine according to claim 1, wherein the open gain is set to 1, the closed gain is set to 0, and the interpolation gain is set to 0 or 1.

4. A knock control device for an engine according to claim 1, wherein the interpolation gain is set in such a way that a vibration level due to noise coming in and out of the knock detection period is nearly the same as a vibration level due to combustion other than the knock at least in the knock detection period.

5. A knock control device for an engine according to claim 4, wherein the interpolation period is set narrower by setting the interpolation gain.

6. A knock control device for an engine according to claim 1, wherein the interpolation period and the interpolation gain are set individually for interpolation periods before and after the knock detection period.

7. A knock control device for an engine according to claim 1, wherein the interpolation period and the interpolation gain are set based on at least one of an engine revolution speed and an engine load.

8. A knock control device for an engine according to claim 2, wherein the open gain is set to 1, the closed gain is set to 0, and the interpolation gain is set to 0 or 1.

9. A knock control device for an engine according to claim 8, wherein the interpolation period and the interpolation gain are set individually for interpolation periods before and after the knock detection period.

10. A knock control device for an engine according to claim 9, wherein the interpolation period and the interpolation gain are set based on at least one of an engine revolution speed and an engine load.

11. A knock control device for an engine according to claim 2, wherein the interpolation gain is set in such a way that a vibration level due to noise coming in and out of the knock detection period is nearly the same as a vibration level due to combustion other than the knock at least in the knock detection period.

12. A knock control device for an engine according to claim 11, wherein the interpolation period is set narrower by setting the interpolation gain.

13. A knock control device for an engine according to claim 2, wherein the interpolation period and the interpolation gain are set individually for interpolation periods before and after the knock detection period.

14. A knock control device for an engine according to claim 2, wherein the interpolation period and the interpolation gain are set based on at least one of an engine revolution speed and an engine load.

15. A knock control device for an engine according to claim 3, wherein the interpolation gain is set in such a way that a vibration level due to noise coming in and out of the knock detection period is nearly the same as a vibration level due to combustion other than the knock at least in the knock detection period.

16. A knock control device for an engine according to claim 15, wherein the interpolation period is set narrower by setting the interpolation gain.

17. A knock control device for an engine according to claim 3, wherein the interpolation period and the interpolation gain are set individually for interpolation periods before and after the knock detection period.

18. A knock control device for an engine according to claim 3, wherein the interpolation period and the interpolation gain are set based on at least one of an engine revolution speed and an engine load.

19. A knock control device for an engine according to claim 4, wherein the interpolation period and the interpolation gain are set individually for interpolation periods before and after the knock detection period.

20. A knock control device for an engine according to claim 4, wherein the interpolation period and the interpolation gain are set based on at least one of an engine revolution speed and an engine load.

21. The knock control device for an engine according to claim 1, wherein the knock detection unit calculates the knock determination threshold value using the knock signal calculated based on at least the following equation:

$$VBGL[n]=KBGL \times VP[n-1]+(1-KBGL) \times VP[n]$$

where VBGL is an average value of the knock signal; VP is the knock signal; KBGL is a filter coefficient, and n is a stroke number.

22. The knock control device for an engine according to claim 21, wherein the knock detection unit calculates the knock determination threshold value using the knock signal calculated based on at least the following additional equations:

$$VVAR[n]=KVAR \times VVAR[n-1]+(1-KVAR) \times \{(VP-VBGL)[n]\}^2$$

wherein VVAR is a variance of the knock signal, KVAR is a filter coefficient for calculating the variance; and n is the stroke number;

$$VSGM[n]=(VVAR[n])^{1/2}$$

wherein VSGM is a standard deviation of the knock signal;

$$VTH=VBGL-KTH \times VSGM$$

wherein VTH is the knock determination threshold value and KTH is a knock determination threshold value coefficient; and wherein the knock detection unit compares the knock signal with the knock determination threshold value using the following equation which further calculates a knock intensity, $$VK[n]=\max\{(VP[n]-VTH[n])/(VP[n]-VBGL[n]),0\} \quad (5)$$

wherein VK is the knock intensity, and if VK>1, a knock occurrence is determined.

23. The knock control device for an engine according to claim 21, wherein high frequency components of the knock signal are removed using the filter coefficient of about 0.95 which is further varied based on a state of the knock signal.

24. The knock control device for an engine according to claim 1, wherein the knock determination threshold value is set in such a way that when the knock does not occur, the knock determination threshold value is larger than the knock signal and when the knock occurs, the knock signal is higher than or equal to the knock determination threshold value.

25. The knock control device for an engine according to claim 1, wherein the knock detection unit compares the knock signal with the knock determination threshold value using the following equation which further calculates a knock intensity, $$VK[n]=\max\{(VP[n]-VTH[n])/(VP[n]-VBGL[n]),0\} \quad (5)$$

wherein VK is the knock intensity, and if VK>1, a knock occurrence is determined.

26. A knock control method for an engine, comprising:
detecting, by a sensor, vibration due to knock of the engine;
performing, by a processor, time-frequency analysis based on the detected vibration during a pre-set digital signal processing period to output a processing result;
calculating a knock signal comprising a peak-hold value in a preset knock window, based on the output processing result and calculating a knock signal position comprising a position where the knock signal is calculated;
calculating a knock determination threshold value based on the knock signal;
detecting the knock by comparing the calculated knock determination threshold value with the knock signal; and
suppressing the knock based on the detected knock and the knock signal position,
wherein the preset knock detection window comprises an open period in which the vibration due to the knock arises, a closed period which is outside the open period, and a predetermined interpolation period, which is provided between the open period and the closed period,
wherein, in the open period, the processing result is multiplied by an open gain which is set to 1,
wherein, in the closed period, the processing result is multiplied by a closed gain which is set to 0, and
wherein, in the interpolation period, the processing result is multiplied by an interpolation gain which is set to a linear interpolation value between the open gain and a predetermined interpolation gain which is a value equal to or between the open gain and the closed gain.

27. The knock control method of claim 26, wherein the predetermined interpolation gain is set to 0.5, the open gain is set to 1, and the closed gain is set to 0.

28. The knock control method of claim 26, wherein the predetermined interpolation gain is set to 1, the open gain is set to 1, and the closed gain is set to 0.

\* \* \* \* \*